Dec. 18, 1951      E. FREYSSINET      2,579,183

METHOD FOR TENSIONING REINFORCEMENTS

Filed June 8, 1945      5 Sheets-Sheet 1

INVENTOR
Eugène Freyssinet
By Watson, Cole, Grindle & Watson

Dec. 18, 1951     E. FREYSSINET     2,579,183
METHOD FOR TENSIONING REINFORCEMENTS
Filed June 8, 1945     5 Sheets-Sheet 2

Dec. 18, 1951　　　　　　E. FREYSSINET　　　　　　2,579,183
METHOD FOR TENSIONING REINFORCEMENTS
Filed June 8, 1945　　　　　　　　　　　　　　5 Sheets-Sheet 3

Dec. 18, 1951  E. FREYSSINET  2,579,183
METHOD FOR TENSIONING REINFORCEMENTS
Filed June 8, 1945   5 Sheets-Sheet 4

INVENTOR
Eugène Freyssinet
By Watson, Cole, Grindle & Watson

Dec. 18, 1951 E. FREYSSINET 2,579,183
METHOD FOR TENSIONING REINFORCEMENTS
Filed June 8, 1945 5 Sheets-Sheet 5

Patented Dec. 18, 1951

2,579,183

UNITED STATES PATENT OFFICE 2,579,183

METHOD FOR TENSIONING REINFORCEMENTS

Eugène Freyssinet, Neuilly-sur-Seine, France

Application June 8, 1945, Serial No. 598,312
In France June 29, 1943

Section 1, Public Law 690, August 8, 1946
Patent expires June 29, 1963

8 Claims. (Cl. 29—148.2)

It has for a long time been acknowledged that tensioning of reinforcements, particularly hooping members for reinforced concrete hollow bodies subjected to internal pressure, is of utmost importance. But while substantially straight reinforcements laid at right angles to the hoops can easily be tensioned according to conventional methods in use with pre-stressed concrete, considerable difficulties arise for tensioning hoops and those reinforcements which by reason of their sinuous outline, their length or any other cause, are exposed to great friction preventing an even tension to be imparted thereto throughout their length by means of jacks acting solely on their ends.

The processes in use for tensioning pipe hoops are scarcely capable of employment in the case of tanks. In the latter case, the simplest process proposed up to this time comprises laying hooping reinforcements on the outer surface of the previously built body to be pre-stressed, and tensioning them by forcing them away from said outer surface by a jack and wedge device. However, this process imposes on concrete much larger stresses than those which concrete will suffer in use or by reason of useful pre-stresses; hence it is necessary to increase concrete thickness; furthermore, between the reinforcements and the surface to be compressed, gaps are produced which must be filled up with concrete; it is then found that the bulk of concrete thus wasted averages that which if properly used would be sufficient for building the tank.

It is an object of my invention to provide an improved process for tensioning reinforcements on hard material such as set and hardened concrete, wherefor simple and little bulky apparatus is needed.

A further object is to provide a process whereby constructions as reinforcements are tensioned, are subjected only to stresses of the same kind as and not higher than those stresses which are produced by the reinforcement tensioned throughout its extent.

A still further object is thus to provide a method whereby constructions may be made with as little expenses as conceivable, from the standpoint of steel and concrete consumption, and scaffolding and man-power cost.

According to this invention, for tensioning a reinforcement, I subject it to $n$ elemental stresses at $n$ successive points along a portion of the reinforcement, which are separated from one another by so short intervals that between two successive points, the tension fall produced by friction amounts only to a small fraction of the elemental stress, then I shift the elemental stress application points step by step along the reinforcement.

My invention also comprises means and devices for carrying out the aforesaid method, and also the products obtained thereby or therewith.

The following description with reference to the appended drawings given solely by way of example will show how this invention may be carried out.

Figs. 1 to 25 relate to tensioning hoops for hollow bodies such as tanks, and further illustrate co-related construction processes.

Fig. 1 is a diagrammatic view having for its purpose to facilitate understanding of explanations given below.

Fig. 2 illustrates the principle of my invention in the case of a hoop wound on a cylindrical body, the pitch of the hoop being exaggerated for the sake of clarity.

Fig. 3 is a diagram showing the tension variations along a hoop coil.

Figs. 4 and 5 are a plan view and an elevation view showing a portion of the tank wall, and a jack device for producing one of the elemental stresses.

Figs. 6, 7 and 7a are sections on a larger scale along lines VI—VI, VII—VII and VIIa—VIIa of a hoop clamping device.

Figs. 8 and 9 are enlarged sections along lines VIII—VIII and IX—IX on Fig. 5.

Fig. 10 is a plan view showing a detail of Fig. 5 on a larger scale.

Fig. 11 shows a detail of Fig. 9 in elevation.

Fig. 12 shows a modification of the device for gripping the hoop to be tensioned.

Fig. 18 is a partial developed view of the upper part of said tank.

Fig. 19 is a partial vertical section of the same.

Fig. 19a is a detail view of the scaffolding on a larger scale.

Fig. 20 is a perspective view showing an embodiment of a lifting appliance for said construction.

Figs. 21 and 22 are a vertical section and an elevation of a device for anchoring vertical reinforcements.

Fig. 23 is a partial vertical view of the means uniting the tank bottom with the vertical walls thereof.

Fig. 24 relates to the construction of covering cupolas.

Assuming a hoop is wound on a cylinder as a continuous helix-H (Fig. 1), and a traction T is exerted at a point $A_1$, the traction $T\alpha$ in the hoop at a point A where the tangent to the hoop curve makes an angle $\alpha$ with traction T, is $$T\alpha = T.e^{-\varphi\alpha}$$

$\varphi$ being the friction coefficient.

For steel reinforcements and cement, $\varphi$ varies from about 0.35 to 0.15 according to the nature of cement and steel surfaces.

Even with small values for $\varphi$, the reinforcement tension quickly falls. Hence, for tensioning a continuous hoop, while limiting the tension variations to an admissible fraction, e. g. 10 per cent, it would be necessary to apply tension at such a point $A_1$ that arc $A—A_1$ is defined by the formula $$e^{-\varphi\widehat{AA_1}} = 0.90$$

this being a fairly small arc with usual friction conditions; then to secure the hoop at $A_1$, then to apply tension at $A_2$ defined as above with respect to $A_1$; and so on. Points A, $A_1$, $A_2$ would be the more proximate as a less tension fall was accepted from $A_1$ to A, $A_2$ to $A_1$, etc. and friction was greater. Points A should be quite numerous. At each one, the reinforcement should so be gripped that the required tension stress which may average its elastic limit is exerted thereon; it would further be necessary to provide numerous rest or backing points $B_1$, $B_2$, $B_3$ . . . each capable of withstanding the total stress T which amounts to several tons with reinforcements of usual dimensions; all conditions being difficult to secure and expensive.

According to this invention, with a view to tensioning the hoop, I split the traction stress T to be applied into a multiplicity of elemental, simultaneous stresses $f_n$ distributed along a portion of the hoop and which it is convenient and economical but not necessary to assume of equal values. The elemental stresses are produced for instance by means of jacks at points $A_1$, $A_2$ . . . $A_n$ on the hoop (Fig. 2), which it is convenient and economical but not necessary to assume so selected that the tangents at $AA_1$ . . . $A_n$ make equal angles with one another. The angles embraced by points A, $A_1$ . . . $A_n$ may be any one; it is generally convenient to select it equal to $2\pi$.

Only the projections of stresses $f_n$ on the tangents to the reinforcement axis at the points where they are applied are actually used and as a matter of fact it will generally be preferable to give said stresses a direction parallel to the reinforcement axis; however this is not a condition indispensible for success.

Forces $f_1$ . . . $f_n$ applied at $A_1$ . . . $A_n$ act simultaneously, and remain constant or vary in accordance with a known law as points A move during resilient elongation of the hoop.

Let use assume for the sake of simplicity that the forces have a common and constant value $$f = \frac{F}{n}$$

Tension will decrease from $f$ to $f$.

$$e^{-\varphi\widehat{AA_1}}$$

between $A_n$ and $A_{n-1}$; it will increase at $A_{n-1}$ by the amount $f$, it will again decrease between $A_{n-1}$ and $A_{n-2}$, then again increase at $A_{n-2}$ by $f$ and so on as shown on the diagram of Fig. 3. In drawing the diagram, I have assumed for simplification purpose, that $n=6$ ($A_n=A_6$) and that the hoop is developed. The hoop lengths are taken as abscissas and the tensions as ordinates. $A_1$, $A_2$ . . . $A_6$ are the positions before applying forces $f$ and $A'_1$, $A'_2$ . . . $A'_6$ the positions after elongation as a result of said forces.

The hoop being attached at an end leaves the cylinder at X, the law of tensions being represented by broken line $b_1a_1a'_1a_2a'_2a_3a'_3a_4a'_4a_5a'_5a_6a'_6$.

It will be realized that the tension increase indefinitely provided arcs $A_1A_2$, $A_2A_3$ . . . $A_5$, $A_6$ are small enough in order that tension fall $$Tr(1 - e^{\varphi A_r A_{r-1}})$$

along arc $A_rA_{r-1}$ is less than force $f$, this being a condition easily fulfilled. The ratio $$\frac{1}{K}$$

between maximum tension T at $A_1$ and the sum $F=nf$ of forces $f$ is not equal to one; it depends on angle $A_1A_n$, $n$ and the steel-concrete friction coefficient $\varphi$; with commonest value of $\varphi$ and $$\widehat{AA_n} = 2\pi$$

K is equal to about 2; sixteen forces $f$ amounting to 500 kg., i. e. with $T=4000$ kg., will produce a tension of 80 kg. per sq. mm. in a round reinforcement having a diameter of 8 mm.

If forces $f$ vary according to known laws, instead of being constant and equal, it is possible to calculate the value of the tension obtained at any point of the reinforcement; calculation is only less simple than with equal and constant forces.

As soon as the $n$ forces applied at $A_1$ . . . $A_n$ have simultaneously been brought into play, force $f$ at $A_1$ (shifted to $A'_1$ by reason of hoop elongation) will be removed, for instance by releasing pressure in the corresponding jack which produces said force; the same force will then be applied at $A_{n+1}$; if angle $$\widehat{A_1A_{n+1}} = 2\pi$$

$A_{n+1}$ will be located just above $A_1$ on a generatrix of the cylinder. Thus tension $$T = \frac{nf}{K}$$

formerly produced at $A_1$ will now be obtained at $A_2$ since $A_2$ is substituted for $A_1$ without any other alteration.

The stress diagram of Fig. 3 is then changed as follows: before pressure release in the jack at $A_1$ tension decreased on the left of $A_1$ to the hoop anchoring point X according to an exponential law represented by curve $a_1b_1$. When force $f$ no longer prevails at $A_1$, the direction of friction is altered from point $A_1$, and the tension law is now represented by $a'_1b'_1$ symmetrical of $a_1b_1$. The introduction of a force $f$ at $A_{n+1}$ results in adding line $a''_2c$ which represents the law of tension finally produced in the zone of point $c$.

A force $f$ will then be transferred from $A_2$ to $A_{n+2}$, then from $A_3$ to $A_{n+3}$ and so on. In so doing, the whole hoop will gradually be tensioned; it may consist of successive sections connected together by welding or clamping. It is sometimes uneasy to provide at the union point as high a strength as in the wire proper. Yet, no difficulty will eventually arise as at such points, tension may be locally lowered by omitting on either side of the union point a number of forces $f$, i. e. simply by avoiding to cause the corresponding jacks or other force producing means to operate; a gradual variation of tension is thus obtained with a minimum tension at the union point, which may be as small as desired. In order to compensate for said local tension reduction, the reinforcement helix pitch may be locally lessened.

It will be realized that the foregoing process does not secure a uniform tension $$T = \frac{nf}{K}$$

but a tension represented by a broken line $cdc_1d_1c_2d_2\ldots$ which may show local tension falls for the single spiral reinforcement in case of local weakening of the strength of said reinforcement. It will also be seen that it is easy to vary the diameter or strength of reinforcements at union points; it is only necessary to alter the number or power of jacks or other means for producing forces $f$.

The difference between minima $cc_1c_2$ and tension $$T = \frac{nf}{K}$$

is very nearly equal to $$\frac{f}{2}$$

it may thus be rendered as small as possible by increasing the number of points A. Hence, the wire may be tensioned to a value whereof the variation with respect to the maximum tension it is capable of withstanding (the latter being equal to elastic limit, either natural or acquired by tensioning to a point largely beyond elastic limit) will be as small as desired. It is only necessary to augment $n$; as a compensation for resulting complication, the unitary forces to be produced are lessened since $$T = \frac{nf}{K}$$

Precautions may however be required in carrying out the aforesaid process. K depends upon friction coefficient $\varphi$. Now $\varphi$ considerably varies according to the condition of contacting surfaces, and even as tensioning proceeds by reason of reciprocal polishing of sliding surfaces, and action of speed which may be high, should for instance compressed air jacks be employed.

Hence a degree of inaccuracy in determining tension T or even breakage of reinforcements may occur.

It is easy to remove this inconveniency since to every tension T corresponds a predetermined elongation L for a given metal. Now elongation L may be fixed with very great accuracy by adjusting the stroke of the tension producing means, for instance by means of adjustable abutments, where jacks are employed. In such a case the jacks should have a power calculated with a value for $\varphi$ at least equal to the actual maximum.

The increase of each one of initial lengths $A_1A_{n+1}$, $A_2A_{n+2}$ etc. will then always be exactly equal to the stroke of the jack which is determined independently of $\varphi$, and this will generally be sufficient to obtain a correct adjustment of the elongations of the various elements $A_1A_2$, $A_2A_3$, etc.; in the case of very irregular values for friction, the local elongations may be adjusted by means of wedging devices which vary for each jack according to its position in the series of jacks.

The process above described may be carried out in many different ways according to circumstances and available means.

As forces $f$ to be applied at points A are but as low as desirable a fraction of the reinforcement elastic limit, it is easy to provide at all said points, without diminishing the resistance of the hoop to breaking, and with a very small bulk, provisional attaching means adapted readily to be placed and removed, which are capable of safely withstanding all forces $f$; the small bulk is momentous in allowing of reducing the distance between the hoop coils as far as needed, and providing hooping pitches which are much variable and may be as small as less than 1.5 times the wire diameter.

Another advantage of the process is that the elongations which may be imposed on the reinforcement are not limited, thereby enabling of employing hard steel machine wire as supplied in coils from rolling works, and subjecting it to a sufficient stretching for raising its elastic limit to a value next to its breaking limit. Such steels are quite unexpensive, their cost being not substantially higher than that of usual round wire for reinforced concrete. Thanks to this invention, it is possible to raise permanent stress to more than 80 kg. per sq. mm., while with tensioned soft steel, stresses in tanks are usually limited to 10 kg. per sq. mm. and often less. When a reinforcement consisting of the strongest tightly positioned coils as can be provided will be found unsatisfactory (this may frequently happen with belts at the level of floor or ceiling cupolas, or in the case of completely closed tanks subjected to high pressures), use shall be made of successive layers of hoops to be produced in the same way, either after embedding already tensioned hoops in a coating or after covering the lastly laid hoop with a net of bars at right angles to said hoops, on which the following hoop will be wound and tensioned.

In usual practice, it will be only necessary to resort to unitary forces of about some hundred kilos. Whatever the size and strength of the reinforcements may be, only the number of points A will increase with said strength, thereby allowing of using the same tools and machinery for quite various applications.

For applying forces $f$ to the hoop, one will use attaching means adapted to be clamped on said hoop at the required point, and devices such as hydraulic or pneumatic jacks designed for exerting traction forces on the attaching means, preferably in a tangential direction with respect to the hoop. The devices will be backed by supports capable of withstanding reaction therefrom.

Referring to Figs. 5 to 10, I shall now proceed with the specification of a particularly advantageous embodiment in which said members take bearing on the very concrete of the construction to be hooped viz. a tank in the example selected.

The attaching means are claws $l$ which are shown on Figs. 4 and 5 and represented in detail on Figs. 6, 7 and 7a. Each claw comprises two plates 2, 3 of hard steel providing at their ends 2a3a (Fig. 6) pliers adapted to hold and firmly squeeze the hoop F placed on concrete of tank R. For this purpose, plates 2 and 3 are pivotally mounted on hard steel rollers 5 in a hole 6 in a plate 7 which is parallel to the tank wall, and they may be moved to squeeze the hoop F by means of screws 8. At their end remote from the gripping ends 2a3a, plates 2 and 3 are connected together by bolts 9. The bolts are secured, for instance riveted, to one of the plates so as to be held against rotation.

The bolts have elongated holes 10 for accommodation of the stem 11 of a piston or plunger 12 which is a part of a jack 13 so that stem 11 becomes fast with the pliers, being squeezed between plates 2 and 3 when nuts 14 are screwed home. Next to bolts 9, plates 2 and 3 comprise inclined side surfaces 2b, 3b which contact hoop F and act to guide the pliers along the hoop when the pliers are drawn by the jack plunger to stretch the hoop.

Plunger 12 movable in cylinder 13 of the jack is urged by a spring 15 when motive pressure no longer acts between said plunger and a packing 16 through which stem 11 passes. Between said packing and the pliers 1 the plunger stem 11 passes through a hollow metal bar 17 providing a bearing for the jack on the concrete of tank R to withstand reaction. The bar 17 is provided at its end away from the jack with a cleft foot 18 (i. e. a foot similar to the foot-presser of a sawing-machine) engaging a groove 19 in concrete along a generatrix of the tank. Horizontally provided at the lower part of said cleft foot, is a groove 18a in which the hoop is accommodated (Fig. 8).

As cleft foot 18 rests eccentrically in groove 19, the back part of the jack tends to be moved away from the tank, but the force necessary to hold it being fairly small, the jack may be retained by means of a strip such as 20 (Fig. 9) which is passed in a groove in the tank concrete under coils of the hoop already tensioned, the position of said strip 20 being adjusted by means of a resilient tongue 21 which abuts on one of the coils. The strip 20 is made fast with the jack by means of a strap 22 which is passed around the jack body.

The device above described operates as follows: the hoop is tensioned from the bottom to the top of the tank as successive coils are wound.

On Fig. 5, coils $F_1F_2F_3$ are already subjected to full tension T, and I have shown at $l_1$ the pliers squeezing the wire at a point $A_1$ at the beginning of coil $F_4$; at $13_n$ the jack of pliers $l_n$ squeezing the hoop at point $A_n$ (pliers $l_n$ would be on the left beyond the limits of the drawing). Pliers $l_1$ and following pliers $l_2 l_3 \ldots l_{n-1}$ which are found in sequence along coil $F_4$ when it is followed in the direction of arrow $p$ are in operation, said pliers being drawn by the corresponding jacks bearing on concrete in grooves thereof, as above described. Pliers $l_n$ which have been withdrawn from the point on coil $F_3$ where they were in the rear of pliers $l_1$ has just been put on hoop ahead of pliers $l_{n-1}$. After the application point has been determined and the free portion of the hoop from reel 23 has been laid, said pliers are caused to squeeze the hoop, then the corresponding jack is positioned by engaging the cleft foot 18 in a concrete groove and strip 20 in another groove (this is always possible provided a net of grooves parallel to the generatrices have been provided before hand on the tank concrete, adjustment of the relative position of the pliers and jack being allowed by unscrewing nuts 14 and moving plunger stem 11 with respect to the pliers). The pliers are set at the proper height so that the hoop portion they squeeze is spaced apart from the foregoing portion by a distance equal to pitch. For this purpose, a rod 24 bent at its lower end may be positioned in the cleft foot 18 so as to be applied on the lower portion of the hoop already tensioned. By unscrewing a set screw 25 holding rod 24 in the cleft foot the position of said rod may be altered according to the pitch selected. It is only necessary to build pressure in the jack so as to develop a force $f$ on the hoop portion between pliers $l_n$ and $l_{n-1}$. Said jack is kept in operation as well as preceding jacks to the jack of pliers $l_2$ inclusively. Pressure is released in the jack of pliers $l_1$, the pliers are opened and are removed together with their jack. A further amount of hoop is unwound from the reel by a length a little longer than the interval between two successive pliers, then pliers $l_1$ which are set free are placed at $l_{n+1}$ on the unwound portion; the corresponding jack is placed, pressure is admitted therein and so on.

It should be understood that alterations may be brought about in the embodiments above described; for instance, clamping members such as 26 (Fig. 12) having a groove 27 for accommodation of the hoop to be tensioned and a passage 28 obliquely set and containing a ball 29 urged by a spring 30 may be substituted for the pliers. Any traction exerted on member 26 according to the arrow produces locking of said member on the hoop, as the ball 29 is wedged between the hoop and the oblique wall of passage 28. Such pliers or clamping members can be easily manufactured as the elemental forces $f$ brought about to produce final tension T are only as small as desired a fraction of said tension.

Instead of jacks for drawing the pliers or clamping members I may use weights attached to cables secured to the pliers or the like and guided on pulleys which may for instance be supported on a scaffolding, an extraneous construction or else the body to be hooped itself.

It is also possible to employ springs having sufficient elongation capability and power, provided the law of variation of load as a function of their distortion is kept into account.

Generally speaking, any means for simultaneously exerting $n$ tractions which are constant or vary according to a known law, preferably means having an adjustable stroke, may be employed.

In the case of jacks, as the elemental forces $f$ are small, the jacks may be operated from commercial compressed air bottles connected with the jacks through pipes provided with valves.

Instead of tensioning reinforcements one by one, as above described, I may also tension $p$ parallel reinforcements arranged as helices having a pitch equal to $p.e$ $e$ being the distance between the axes of two reinforcements; in this case, it is necessary to use $n.p$ jacks and $$A_1 A_{n+1} = \frac{2\pi}{p}$$

Figure 13:
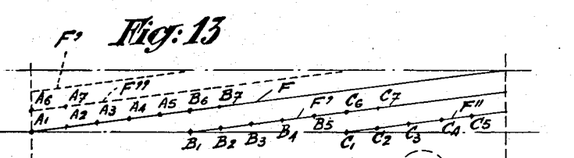
Fig. 13 is a development of the wall of a cylindrical tank, showing the use and simultaneous tensioning of three helical hoops.

Fig. 13 is a development of the cylindrical tank wall. It corresponds to $n=5$ and $p=3$.

The three hoops are shown at F, F', F''. The jacks are firstly at $A_1 A_2 \ldots A_5$ on hoop F, at $B_1 B_2 \ldots B_5$ on hoop F' and at $C_1 C_2 \ldots C_5$ on hoop F''. Pressure is then released from jack $A_1$ on hoop F, which is then placed at $A_6$ on hoop F''. Then pressure is released from jack $B_1$ which is moved from hoop $F'$ to be placed at $B_6$ on hoop $F$; pressure is released from jack $C_1$ which is moved from hoop $F''$ to be placed at $C_6$ on hoop $F'$; jack $A_2$ will then be removed to $A_7$, jack $B_2$ to $B_7$, jack $C_2$ to $C_7$ and so on.

The foregoing process increases the number of manoeuvres but it reduces both factors K and the stroke of jacks. Of little interest for small tanks, it is advantageous with very big tanks, for which special jacks with long stroke should otherwise be employed. It enables of making big tanks with the same machinery as for small ones. It may happen that available jacks have too short a stroke for producing required elongations and other ones are not available. In this instance, after $n$ jacks from $A_1$ to $A_{n+1}$ have been tensioned, instead of moving jack $A_1$ to $A_{n+1}$ after pressure release, it will be placed to initial position $A_1$ which has become $A'_1$ and so on with each one of the $n$ other jacks.

It is thus possible to double the elongation obtained for the reinforcement during the first operation. This may be repeated as many times as necessary, say $m$ times, each jack being given a stroke equal to the quotient by $m$ of the total elongation to be produced for each coil. The steel wires to be employed for hoops may be delivered in coils of limited length which may be unwound by means of a reel supported for instance on a lorry mounted on a circular track concentrical with the tank, built on the ground or any floor.

When the reel is empty, a new coil will be placed thereon, and the wire thereof will be welded or clamped to the preceding wire; as above explained, tension in the clamping zone may be reduced by leaving on either side of the clamp an interval in which the jacks which normally would be caused to act thereon, will not be placed.

The process and indications given above may be widely used and they may be employed for pre-stressing not only cylinders but also any convex bodies, not necessarily revolution bodies, provided one can furnish them with bearing surfaces for reinforcements in the form of steps at right angles to the curvature plane.

For instance, for a cereal storing tank shaped as a cone supported on pillars, the outer surface will be provided with helical steps having vertical generatrices and a pitch equal to that of reinforcements, or cylindrical steps connected by inclines, and tension will be produced either by attaching the jacks to the pillars or as before explained. It is not indispensable that the cone is a revolution cone; its cross section may be an oval or any combination of circles and straight lines, provided the thicknesses and stresses are calculated accordingly and the wall comprises no concave portion unless it is admissible that reinforcements do not contact the wall.

It is likewise possible to compress spherical caps, tori, even surfaces which are not revolution surfaces after arranging the surfaces to allow a normal bearing for the reinforcements and their continuous winding. Any convex surface may be hooped according to the processes above described. In particular, my process enables of making cylindrical tanks, bottles, sphero-conical elements or the like.

Although very simple, my invention has a very great practical importance since in contradistinction with any and all tank hooping methods contemplated up to this time, it enables of obtaining a maximum saving in constructing tank, not only as concerns steel but also and chiefly in respect of concrete, scaffolding and the man-power, whatever the dimensions of the tank and the inner pressure therein may be. Especially, it is possible to build laboratory tubes having huge dimensions and for non-limited pressures which may be as high as thousands of kilos per square centimeter. In constructing tanks according to standard practice, such a saving is far from being obtained; in reinforced concrete tanks, it is to accept for concrete very low traction rates, about 10 to 20 kg. per sq. cm., and for steel about 8 to 10 kg. per sq. mm. Now, particularly upon vibrated tables, it is possible to produce concretes adapted to withstand 1000 kg. per sq. cm. and which may be pre-stressed to 300 kg. cm. without any risk; thus a tank having a diameter of 30 m. and a height of 20 m., may have a wall thickness of 10 cm. at its base, while with conventional technics, the thickness should be about 1 meter or more.

The method according to this invention allows of practically making tanks with a theoretical thickness, whatever small it may be. Now, from all standpoints, saving, cumbersomeness heightness, chemical stability of the construction, it is preferable to have a small, absolutely impervious, non-porous and defectless layer of concrete rather than a large thickness of mean concrete. But in order that a big tank may be made with small thickness, it is not sufficient that they provide for stability after completion, it is further necessary that it can actually be constructed. The construction possibility is grounded on the assumption that:

1. The reinforcement tensioning process subjects the construction only to stresses not higher than that imposed on the completed construction;
2. The construction is capable of withstanding accidental stresses, notably those arising from wind, at any stage in the process of construction.

Generally speaking and particularly in respect of the above embodiment, my reinforcement tensioning process is believed to comply with the first condition, because only tangential stresses evenly distributed or not higher than maxima tangential efforts are imposed on the construction.

I shall now proceed with the description of a manner of construction by means of pre-moulded panels in combination with hoop tensioning, by successive elements, in order to comply with the second condition. Reference will be had to Figs. 14 to 22.

In this process which is applicable to vertical cylindrical tanks, the base will first be made in any suitable manner (an example will be hereinafter described). Above the base which shall be assumed cylindrical, the wall is built from panels P limited by two cylindrical surfaces which will form the inner and outer surfaces of the tank, by planes containing the axis of said tank, and by cross sections. The panel thickness may be altered by providing a slight conicity for the inner or outer surface. As a limit for the panels, it is generally preferable to substitute for planes containing the cylinder axis, planes tangent to a cylinder having a small diameter, coaxial with the tank (Fig. 16), and for cross section planes, cones having an apex half-angle very close to 90° (Fig. 17) so as to have thicker joints on the inner side than on the outer side. The panels are formed with outer grooves, the edges of which are in parallel relationship with the generatrices and the depth a little larger than the thickness of the vertical straight reinforcements, the width being approximately double (the same grooves may be used for backing the tensioning jacks as above described, or other grooves may especially be provided therefor). The size of the panels will be such that they can be handled easily, while reducing the number of joints to a minimum.

The component panels will generally be made of the best grade concrete, cast on a vibrated table or treated in any other manner securing a very high compactness. The panels may also be made from freestone, moulded materials of any kind, synthetic resin, glass, metal, mixed materials, concrete coated with special materials or metal and so on.

It will be obvious that such a construction may be carried out in many different manners as concerns its details, and the following is but an example for illustrating the outstanding features thereof.

Figures 14, 16:
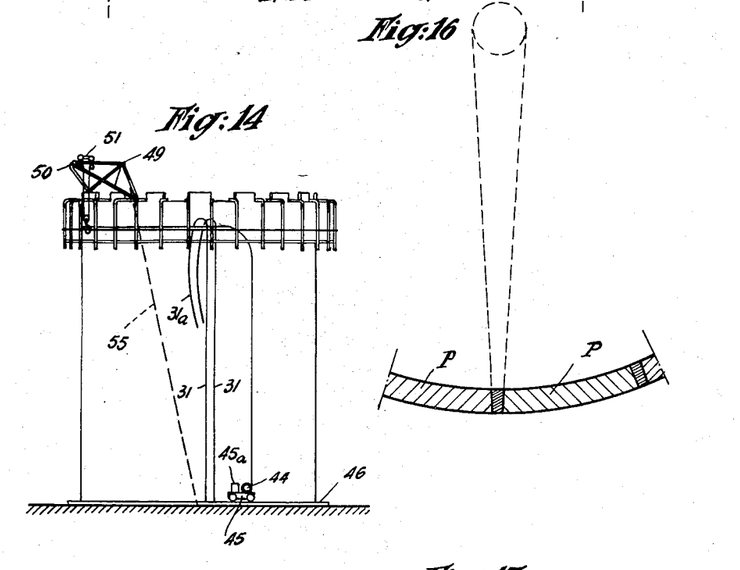
Figs. 14 and 15 are an elevation and a plan view showing the organization of a yard for building a cylindrical tank.
Figs. 16 and 17 are a horizontal and a vertical section of previously moulded panels constituting said tank.
Figure 15:
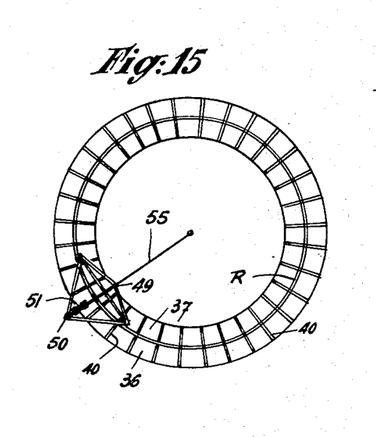
Figure 17:
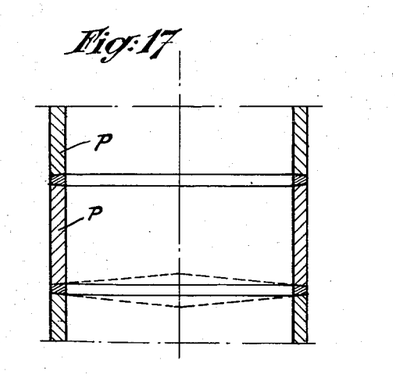

In this example, the panels are placed with the horizontal joints in slashed or staggered arrangement (Figs. 14 and 18). The vertical joints are straight so that all grooves run from the bottom to the top of the tank. The first row will consist for a half, of half-panels, or panels projecting by a half of their height into the base.

The outstanding features of this embodiment are as follows:

1. Hooping under tension follows positioning of the panels except on a small fraction of the panel height.
2. Before hooping, all vertical reinforcements or a part thereof are placed and tensioned.

Horizontal joints, generally from mortar. are made after laying said panels on easily removable wedges; vertical joints are made between two plankings, strongly held by presses, either by stamping or by a strong vibration produced for instance by means of a metal sheet which is coextensive with the whole joint and may even be left therein for reinforcing the joint mortar and thus increase its strength. The horizontal joints will preferably be stamped or battered in outward direction from within the tank.

However any other type of joints may be contemplated such as plastic joints, metallo-plastic joints and so on. Where panels have been produced with utmost precision in very accurate molds, or the faces for joints have been ground, joints may even be omitted. Horizontal joints may be made only after hooping, as hooping in causing squeezing of vertical joints secures sufficient continuity in the construction; one is thus certain that distortions arising from hooping will not dislodge horizontal joints.

Vertical joints should comply with the condition that their ability to distortion when steels are tensioned is very slight, in any case compatible with the distortions of the whole unit. By the way, the ability to distortion of stamped or vibrated mortar joints produced as above set forth is practically negligible, and their strength is above any one practically needed, chiefly where a thin sheet metal is inserted as above described.

As concerns vertical reinforcements, all those which start from the base of the construction are placed from the beginning, it being understood that at any level the number thereof may be increased or diminished. Unless they are anchored in base made before-hand, they will be anchored on the panels as follows: they will be accommodated by pairs in a part of the grooves provided in the panels. At the lower end of reinforcements 31 (Figs. 21 and 22), the grooves open in recesses 32 in which are disposed steel anchorage plates 33, having frusto-conical recesses 34 through which the reinforcements are passed. By forcing a wedge 35 into the recess between the reinforcements, the latter are jammed therein. They may then be tensioned by being drawn from their upper ends, when the construction has risen up to the level of said ends. Up to this moment, the upper part of the reinforcements will be rolled into a coil or bent in waiting position as shown at 31a (Figs. 14 and 19).

The hooping process is started as soon as the first two half-courses of panels are laid, to wit, one consisting of odd panels imbedded by a half thereof in the base or reduced to half panels, the other one consisting of even entire panels. Hooping is made about vertical reinforcements anchored at their lower part as above described, and is proceeded with along a fraction of about ⅔ or ¾ of the available height of odd panels. Odd panels of the upper course are then laid, a part of the vertical reinforcements being unrolled into the panel grooves, then hooping is proceeded with and so on.

The vertical reinforcements are tensioned when the construction has been raised up to the level of their upper ends. They are tensioned for instance by drawing said ends by means of jacks which are backed by the panels and a plate jammed on the reinforcements by a wedge; they are then anchored definitely by a second wedge plate, symmetrical of the one shown on Figs. 21 and 22, then the free ends beyond the anchorage are cut off.

Likewise, some vertical reinforcements may be extended up only to a certain level, then further ones are added as soon as the panels to which they should be anchored at their lower ends are laid, and before hooping has proceeded as far as the level of said anchorages.

Vertical reinforcements may be anchored provisionally in intermediate parts thereof, either by means of wedge plates as above described, or by means of gripping devices designed for a faster dismounting of the provisional anchorages. This may be useful, particularly in the case of very high tanks having a constant or little variable density of reinforcements. By reason of accidental stresses such as produced by wind, it is felt necessary to set up vertical pre-stresses before the construction is completed. $1/n$th of the reinforcements may then be tensioned at a level $a$, another $n$th at level $2a$ and so on, all of them being tensioned at level $na$, then releasing tension in the first $n$th, tensioning it again at level $2na$ and so on.

For building the upper part of the tank, a scaffolding and lifting means are required.

By way of nonlimitative example, a scaffolding of the type shown on Figs. 14, 15, 18 and 19 may be employed. It comprises two platforms 36, 37, the former outside the construction and the latter inside. Each platform comprises elements 38 of a length equal to the breadth of a panel, said elements (Fig. 19a) being pivotally mounted at their ends 38a on horizontal tubes 39 which are attached to vertical bars or tubes 40, 40a and provide brackets in combination with their struts 41. Tubes 40, 40a constitute frames shaped as inverted U's, so that they can be hung from the upper edge of the lastly erected panels (Fig. 19). The scaffolding runs round the whole periphery of the construction, to enable of progressively placing and tensioning the hoop, and adding panels. It will subsequently be used for applying protective coatings to prevent corrosion of the reinforcement; however, said coatings can be applied only after completion of tensioning both for vertical reinforcements and horizontal reinforcements.

The inner platform 37 is a little above the outer platform to allow of operating a crane as described below. Counter-weights 42 are attached at intervals to the frames within the construction to secure rest of the lower ends of tubes 40a on the inner wall of the construction, while outer tubes 40 tend to be moved away from said wall, leaving between the latter and the outer platform 36 a gap 43 through which pass the free end of the hoop and the vertical reinforcements 31 in waiting position.

The hoop is unwound from a coil 44 (Fig. 14) carried on a lorry 45 which is moved on a circular track 46 laid on the ground around the construction. On the lorry may also be supported a welding machine 45 for making welds when a coil has been used up and a new coil should be substituted.

On the left-hand portion of Fig. 18, frames 40, 40a are shown as hanging from the upper edges $a, b, c, d$ of the half-row of even panels $P_2P_4$. On the right-hand portion, even panels $P'_6P'_8$ of the upper half-row have just been laid, and frames 40 have been raised to hang from edges $e, f, g, h$ of odd panels $P_5, P_7$, this being possible owing to the provision for pivotal movement of platform elements.

A crane is used to lift and place panels. This crane, a very light one, comprises a-frame made of tubes or other parts disposed and assembled together like the sides of a tetrahedron. Side 47 has end lugs 48 which may comprise ball joints, to support the crane on the edges of panels. Above said side, an apex 49 overhangs the inside of the construction, while the other apex 50 overhangs the outside, without the periphery of the construction and platform 36. The side which connects apices 49, 50 is a rail for a carriage 51 supporting tackle pulleys 52. The hoisting cable 53 passing on the tackle is hung from an end thereof at 50, while its other end is wound on a winch 54. A cable 55 anchored to the ground within the construction and passing through a tube 56 fixed to the crane frame provides a stay or guy for said crane; cable 55 is finally attached to the crane frame. By drawing or releasing the lower end of cable 55, the worker in charge of the crane may lift or lower apex 50. The crane is used to hoist panels and scaffolding members; it is moved up as panel laying proceeds.

A half-row of half-panels is finally laid at the top of the construction.

It will readily be understood that a tank constructed as above described or with equivalent means is subjected in its making only to stresses smaller than the permanent stresses it will subsequently be subjected to; hence its thickness may be calculated as if it were a homogeneous body having the same strength as pre-stressed concrete, and reduced to the theoretical minimum.

Fig. 23 shows in vertical section an embodiment in which the tank bottom 57, separately built, is made fast with lower panels P by tightening hoops Fa, comprising one or several successive layers; the bottom is thus pre-stressed and need not be reinforced.

Before hooping, a joint or packing 58 is interposed between panels P and bottom 57.

Instead of being planar as shown, the bottom or base may be shaped as a convex or concave spherical cap.

The foregoing means enable of very simply making bottoms adapted to withstand high pressures and it is obvious that they may be used for building bottoms of any shape, position and inclination.

Fig. 24 which is a partial vertical section illustrates the application of the means above described to the manufacture of non-cylindrical bodies such as bottom or top cupolas for tanks.

The left-hand portion of said figure shows a cupola overhanging the inside of a tower forming the tank base. The cupola is made of successive panels P which rest on the ended vertical wall V and are provided on their upper faces with recesses 59 forming after assembly a helical ridge on which a hoop is positioned and tensioned, after reinforcements 60 have previously been laid in panel grooves located along meridian lines of the spherical surface.

The right-hand portion illustrates an element of a conical or torical bottom located outside cylindrical tower V.

Hooping allows of giving concrete an excellent compactness amongst other qualities so that hooped concrete tanks and vessels are tight, even with respect to hydrocarbons.

Figure 25:
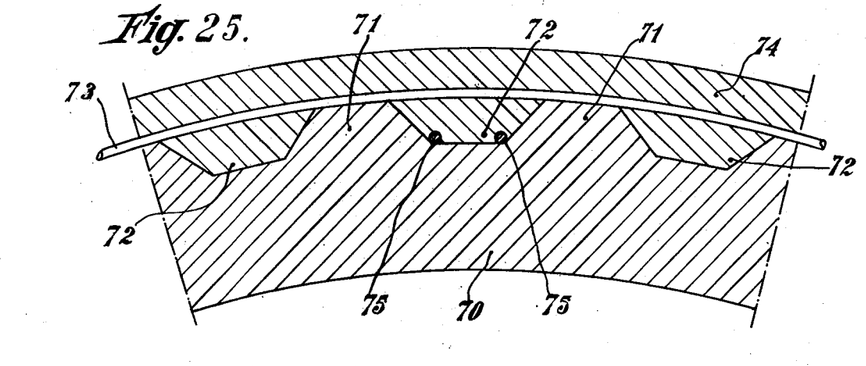
Fig. 25 is a partial cross-section of a tank and shows a detail thereof.

In such a hooped hollow body where concrete is exposed to flowing, the phenomenon entails a shortening of the tank diameter, and consequently, centrifugal forces set up which tend to unstick the coating provided on the reinforcements. Said forces are the more important as the coating is stiffer, i. e. thicker. In order to prevent unsticking, the outer surface of concrete wall 70 may be provided with projections 71 and recesses 72 (Fig. 25), preferably cylindrical. The hoop wires 73 contacting projections 71, the coating mortar 74 may thus embed reinforcement wires opposite said recesses, thereby securing a double advantage:

1. Coating 74 is held by wires against wall concrete 70.
2. Hoop wires 73 and straight reinforcements 75 which may be placed in recesses 72 remain protected, even should the coating happen partially to unstick.

Although I have described my invention in connection with tensioning hoops, it is of a very wide scope. It may be applied to tensioning reinforcements of any kind which by reason of their sinuous form, length or other cause cannot be evenly tensioned throughout by means of jacks acting solely on their ends.

Figure 26:
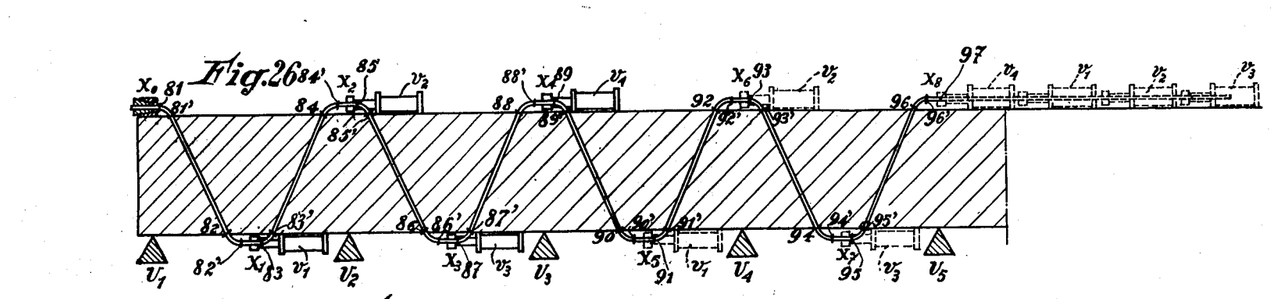
Fig. 26 illustrates an application of my invention to tensioning a reinforcement in a concrete beam, after setting and hardening of the material.

As a further example, Fig. 26 illustrates a beam resting on five supports $U_1U_2U_3U_4U_5$.

The tensioned reinforcement after setting of concrete assumes the shape formed by sinuous line $X_0X_1X_2X_3X_4X_5X_6X_7X_8$.

The line includes 16 curved elements 81—81', 82—82', . . . 96—96', separated by inaccessible straight portions 81'—82, 83'—84, . . . 95'—96, and accessible portions 82'—83, 84'—85, . . . 96'—97.

Assuming that the anchorage at $X_0$ has been made in any manner, a jack is placed for instance at every accessible point $X_1X_2X_3X_4$, thus as a whole four jacks each of which produces the same action $f$. The sum of said actions produces a traction T at $X_0$ according to the above described process.

Jack $v_1$ at $X_1$ is put out of operation and shifted to $X_5$ where it will be caused to produce the same action $f$. The same traction as at $X_0$ will thus be obtained at $X_1$.

All jacks are likewise shifted successively until one is to be placed at the last accessible point $X_8$.

When the last jack $v_4$ is put in its place, the jack $v_1$ at $X_5$ is put out of operation and is placed ahead of jack $v_4$ at $Z_8$; it is then caused to develop a pre-calculated force to produce at $X_5$ the same traction as at $X_0$.

Jacks $v_2$ and $v_3$ are likewise shifted ahead of $v_4$ and $v_1$, and caused successively to develop predetermined actions which will result in causing at points $X_6X_7X_8$ the same traction as at $X_0$.

In order to simplify operations, the shifting of jacks $v_1v_2v_3$ ahead of jack $v_4$ may be omitted, jack $v_4$ being caused successively to produce actions equal to those obtained by successively placing jacks $v_1v_2v_3$.

Means may of course be provided to reduce friction; for instance fatty materials may be placed in the passages in concrete for the reinforcements to be tensioned.

Each jack may take its bearing on concrete.

Reinforcements assuming the shape of a broken line or reinforcements consisting of a wire, a group of wires or a cable may thus be tensioned.

My invention is applicable to any member including one or more reinforcements having sinuous forms. At any point where it is possible to grasp the reinforcement, a stress compensating, for tension falls between said point and the preceding one may be exerted by means of an intermediate jack or in any other manner. Tension falls are thus reduced to a minimum.

It should be understood that the foregoing embodiments have been given solely by way of example and may be altered without departing from the spirit of this invention.

It should be understood that the word "rod" as used in the claims does not connote any limitation in transverse dimensions of the reinforcing element, which may be a wire, bar, or rod as commonly employed in the art of reinforced constructions of the general nature under consideration.

What I claim is:

1. The process of setting up a predetermined permanent prestress T in a reinforcing rod frictionally engaging a curved surface of a body of hard material to be subjected to permanent compression stresses, which comprises first putting the rod into contact with said body along a curved line, anchoring the rod at one end to said body, then simultaneously applying to said rod a plurality of tensioning forces directed tangentially of said rod and away from said anchored end at a plurality of closely spaced points along a portion of the rod adjacent the anchored end while maintaining said rod in frictional contact with said body, the aggregate of said tensioning forces being at least as great as the total force precalculated to set up said stress T with friction taken into account, the distance between any two adjacent points being so small that the tension drop caused by the friction of the rod against the body between said adjacent points is only a small fraction of the said tensioning force, releasing the tensioning stress at the first of said points nearest the anchored end while maintaining the tensioning forces at the other points, applying a tensioning force substantially equal to the said released stress, tangentially of said rod at a further point on the rod beyond the last of said above-mentioned points, at so small a distance from said last point that the tension drop caused by friction between said further point and the last point is only a small fraction of the newly applied tensioning force, and proceeding further in the same manner point by point along the length of the rod to be tensioned and maintained in frictional contact with said body, and finally anchoring the other end of said rod to said body.

2. The process of setting up a predetermined permanent prestress T in a reinforcing rod anchored at an end to a body of hard material to be subjected to permanent compression stresses, said body having a curved surface and said rod frictionally engaging said body along a curved line, which comprises first applying to said rod along a portion adjacent the anchoring and at $n$ points substantially evenly distributed thereon while maintaining said rod in frictional contact with said body, $n$ elemental tensional forces directed tangentially of said rod and away from said anchoring end each of which amounts to $$\frac{F}{n}$$

F being the total force precalculated to set up said stress T with friction taken into account, while $n$ is an integer sufficiently great so that the tension drop caused by the friction of the rod against the body between any two adjacent points is only a small fraction of the force $$\frac{F}{n}$$

releasing the tensional force at the first of said $n$ points while maintaining the tensioning forces at the other points, applying then an equal elemental force at a further point of the rod beyond the last of said points and tangentially with respect to said rod and at a distance from said last point equal to the distance between two adjacent of the $n$ points, and proceeding further in the same manner point by point along the length of the rod to be tensioned and maintained in frictional contact with said body, and finally anchoring the other end of said rod to said body.

3. The process of setting up a predetermined permanent prestress T in a reinforcing rod forming an helical coil disposed about and frictionally engaging a substantially cylindrical body of hard material to be subjected to permanent compression stresses, which comprises first putting the rod into contact with said body along at least a part of said coil, anchoring the rod at one end to said body, then simultaneously applying to said rod, while maintaining said rod in frictional contact with said body, $n$ tensional forces directed tangentially of said rod and away from said anchored end at $n$ points substantially evenly distributed along the coil over a sector substantially equal to $2\pi$, while maintaining said rod in frictional contact with said body, the aggregate of said tensioning forces being at least as great as the total force precalculated to set up said stress T with friction taken into account, $n$ being an integer above one and sufficiently great so that the tension drop caused by the friction of the rod against the body between any two adjacent points is only a small fraction of the said tensional forces, releasing the tensional force at the first of said $n$ points while maintaining the tensioning forces at the other points, applying a tensional force substantially equal to the last-named one and tangentially of said rod at the point of said coiled rod which lies in sequence to the $n$th point, opposite said first point, and proceeding further in the same manner point by point along the length of the rod to be tensioned and maintained in frictional contact with said body, and finally anchoring the other end of said rod to said body.

4. The process of setting up a predetermined permanent prestress T in a reinforcing rod in frictional contact along a curved line with a non-planar rigid body to be subjected to permanent compression stresses, which comprises anchoring the rod at one end to said body, applying to said rod substantially equal tensional forces directed tangentially of said rod and away from said anchoring end, at the first $n$ points of a series of $p$ successive proximate points substantially evenly distributed along said rod, $p$ being larger than $n$, while maintaining said rod in frictional contact with said body, the aggregate of said tensioning forces being at least as great as the total force precalculated to set up said stress T with friction taken into account, releasing the tensional force at the first of said $n$ points while maintaining the tensioning forces at the other points, then applying a like tensional force to the rod at the $(n+1)$th point and tangentially of said rod, and proceeding with the shifting of tensional forces throughout said series of $p$ points until a tensional force is applied at the $p$th point, the distance between any two adjacent points in the series being small enough so that the tension drop caused by the friction of the rod against the body between said two points is only a small fraction of the tensional force, and finally anchoring the other end of said rod to said body.

5. The process of setting up a predetermined permanent prestress T in a reinforcing rod anchored at an end to a non-planar rigid body to be subjected to permanent compression stresses, said rod frictionally engaging said body along a curved line, which comprises grasping said rod with squeezing means at the first $n$ points adjacent the anchoring end in a series of $p$ successive, spaced-apart points along said rod, simultaneously drawing all said squeezing means in directions away from the anchored end, substantially tangential to said rod at said $n$ points, while maintaining said rod in friction contact with said body, the aggregate of said tensioning forces being at least as great as the total force precalculated to set up said stress T with friction taken into account, through the instrumentality of removable tensioning means temporarily connected to said body and connected to the corresponding squeezing means, then putting the tensioning means out of operation at the first of said $n$ points and disengaging the corresponding squeezing means while maintaining the tensioning forces at the other points, grasping said rod with the last-named squeezing means at the $(n+1)$th point, placing the last-named tensioning means in position for operating the last-named squeezing means, drawing said last-named squeezing means in a direction away from the anchored end, substantially tangential to said rod at said $(n+1)$th point, through the last-named tensioning means, and so on until the $p$th point is reached, and finally anchoring the other end of said rod to said body.

6. The process of claim 1, which further comprises progressively building said body of hard material, and proceeding with the step-by-step tensioning as building proceeds.

7. The process of claim 1, the body of hard material being cylindrical, which comprises first anchoring at an end of said body a plurality of straight reinforcements, laying them along the outer periphery of said body along generatrices of said cylindrical body, then anchoring at said end and winding as a spiral a reinforcing rod which is prestressed as set forth in claim 1.

8. The process of claim 1, said rod being laid sinuously to pass through said body a plurality of times after the manner of a stitching, so as to comprise exposed portions on opposite sides of said body, and applying said tensioning forces at points on the exposed portions.

EUGÈNE FREYSSINET.

REFERENCES CITED

The following references are of record in the file of this patent:

UNITED STATES PATENTS

| Number | Name | Date |
|---|---|---|
| 772,117 | Winslow | Oct. 11, 1904 |
| 903,909 | Steiner | Nov. 17, 1908 |
| 915,555 | Conner | Mar. 16, 1909 |
| 1,281,201 | Peterson | Oct. 8, 1918 |
| 1,651,521 | Girardville | Dec. 6, 1927 |
| 1,969,540 | Bergstrom | Aug. 7, 1934 |
| 2,136,538 | Borwick | Nov. 15, 1938 |
| 2,191,025 | Mitchell | Feb. 20, 1940 |
| 2,273,736 | Raymond et al. | Feb. 17, 1942 |
| 2,303,394 | Schorer | Dec. 1, 1942 |
| 2,348,765 | Trickey et al. | May 16, 1944 |
| 2,382,139 | Cueni | Aug. 14, 1945 |